(12) United States Patent
Palm et al.

(10) Patent No.: US 8,872,893 B2
(45) Date of Patent: Oct. 28, 2014

(54) SYSTEMS AND METHODS FOR MANAGING DISTRIBUTION OF 3D MEDIA

(75) Inventors: Stephen Ray Palm, Irvine, CA (US); William John Fassl, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 677 days.

(21) Appl. No.: 13/081,387

(22) Filed: Apr. 6, 2011

(65) Prior Publication Data

US 2011/0292171 A1  Dec. 1, 2011

Related U.S. Application Data

(60) Provisional application No. 61/396,314, filed on May 26, 2010, provisional application No. 61/398,284, filed on Jun. 22, 2010.

(51) Int. Cl.
*H04N 15/00* (2006.01)
*H04N 13/00* (2006.01)
*H04N 21/81* (2011.01)

(52) U.S. Cl.
CPC ....... *H04N 13/0059* (2013.01); *H04N 13/0003* (2013.01); *H04N 13/0062* (2013.01); *H04N 13/0051* (2013.01); *H04N 21/816* (2013.01)

USPC .................................. 348/43; 348/42; 348/51

(58) Field of Classification Search
CPC .......... H04N 13/0059; H04N 13/0051; H04N 13/0062; H04N 13/0003
USPC ................................................ 348/42, 43, 51
See application file for complete search history.

(56) References Cited

U.S. PATENT DOCUMENTS 6,765,568 B2 * 7/2004 Swift et al. ..................... 345/419
8,306,387 B2 * 11/2012 Yamashita et al. ............ 386/239

* cited by examiner

*Primary Examiner* — Geepy Pe
(74) *Attorney, Agent, or Firm* — McDermott Will & Emery LLP

(57) ABSTRACT

Systems and methods for managing distribution of three dimensional visual media to a plurality of displays. For example, there is a content server for managing distribution of three dimensional (3D) visual media to a client over a. network, where the client has a display.

The content server comprises a server processor configured to determine a plurality of supported 3D) modes of the client, enable one the plurality of supported 3D modes, and provide the 3D visual media to the client for presentation on the display of the client.

20 Claims, 4 Drawing Sheets

SYSTEMS AND METHODS FOR MANAGING DISTRIBUTION OF 3D MEDIA

RELATED APPLICATIONS

This application is based on and claims priority from U.S. Provisional Patent Application Ser. No. 61/396,314 filed on May 26, 2010 and U.S. Provisional Patent Application Ser. No. 61/398,284 filed on Jun. 22, 2010, which are hereby incorporated by reference in their entirety.

BACKGROUND OF THE INVENTION

1. Field of the Invention

The present invention relates generally to media devices. More particularly, the present invention relates to 3D visual media devices.

2. Background Art

Controlled distribution has become an important prerequisite for most technological advances involving contemporary media. Most audio receivers are now manufactured with network connections to enable streaming of digital music from a personal repository, and more recently, commodity electronic device manufacturers have flooded the market with dedicated set top boxes for streaming video over personal networks. However, large content providers have balked at utilizing such consumer-managed devices and networks to distribute their content, particularly when it is protected content, due to security as well as general reliability concerns. Unfortunately, this hesitation has limited uptake and growth of technological advances with respect to three dimensional (3D) visual media.

In particular, while display manufacturers have increased the range and number of 3D displays offered to consumers, and even though there are a wide range of theatrical 3D visual media releases as well as an increasing number of sports related 3D visual media releases, many consumers are ambivalent about purchasing a 3D display because most content providers, such as cable TV and satellite TV providers, for example, do not want to expend time and money to make their systems compatible with distribution of 3D visual media, such as 3D television (3DTV). Moreover, as noted above, content providers are typically unwilling to rely only on consumer-managed devices and networks to provide compatibility due to security and reliability concerns.

Accordingly, there is a need to overcome the drawbacks and deficiencies in the art by providing relatively inexpensive and easily implementable systems and methods for managing distribution of 3D visual media, particularly across a network that may include both content provider-managed and consumer-managed devices.

SUMMARY OF THE INVENTION

The present application is directed to systems and methods for managing distribution of 3D media, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
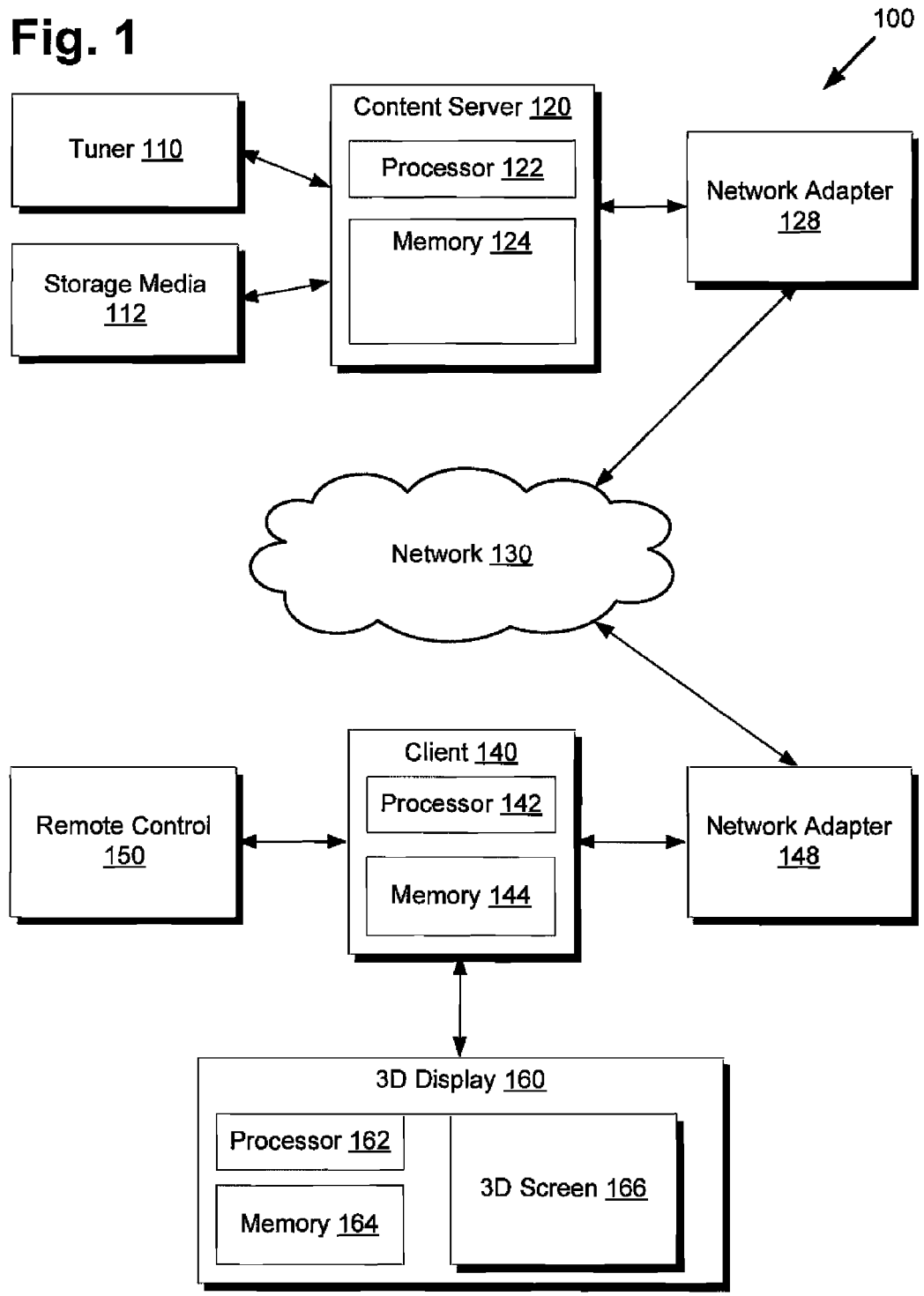
FIG. 1 presents a diagram of a system for managing distribution of 3D media, according to one embodiment of the present invention.

The present application is directed to systems and methods for managing distribution of three-dimensional (3D) media. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows 3D media distribution system 100 configured to manage distribution of 3D visual media, according to one embodiment of the present inventive concepts. As shown in FIG. 1, 3D media distribution system 100 includes content server 120 providing 3D visual media to client 140 over network 130. Content server 120 may include processor 122 and memory 124, for example, and may be configured to use tuner 110 and/or storage media 112 to access 3D visual media. Tuner 110 may be any device capable of receiving 3D visual media from a wired or wireless source, for example, such as a cable, over-the-air (OTA), or satellite television (TV) tuner, or the like, and tuner 110 may be configured to provide the 3D visual media to content server 120. Storage media 112 may be any memory storage media, such as a hard drive or an optical disk, for example, configured to store 3D visual media and/or to provide the stored 3D visual media to content server 120.

For example, content server 120 may be configured to use tuner 110 to access a 3D visual media broadcast over a cable TV network and, at substantially the same time, use storage media 112 to store the 3D visual media broadcast for later access. Alternatively, or in addition, content server 120 may be configured to simply access 3D visual media already stored on storage media 112, such as accessing 3D visual media stored on an optical disk, for example.

According to the embodiment shown in FIG. 1, content server 120 is coupled to client 140 over network 130 using network adapters 128 and 148. Network 130 may be a wired or wireless network, for example, or may be a mixture of wired and wireless networks, such that one network adapter may be configured to connect to network 130 wirelessly while the other network adapter may be configured to connect to network 130 through a wired connection. Client 140 may include processor 142 and memory 144, for example, and may be configured to accept 3D visual media provided by content server 120 over network 130 and, in turn, provide the 3D visual media to 3D display 160. As shown in FIG. 1, 3D display 160 may include processor 162 and memory 164, for example, and may be configured to accept 3D visual media from client 140 and present it using 3D screen 166. 3D screen 166 may be any device capable of reproducing a 3D image. For instance, 3D screen 166 may comprise a stereoscopic 3D screen or collection of screens, for example, capable of providing left and right images for left and right eyes of a user of 3D media distribution system 100. In some embodiments, 3D screen 166 may utilize a stereoscopic aid (not shown in FIG. 1), such as stereoscopic glasses, for example, to facilitate presentation of left and right images to left and right eyes of a viewer, as is known in the art.

Although tuner 110, storage media 112 and network adapter 128 are depicted as external to content server 120 in FIG. 1, in other embodiments, one or more of the external devices may be integrated with content server 120, and, furthermore, may be absent in some embodiments. Similarly, in some embodiments of the present inventive concepts, one or more of network adapter 148 and 3D display 160 may be integrated with client 140, or may be absent in other embodiments. In those embodiments where 3D display 160 is separate from client 140, such as the embodiment shown in FIG. 1, client 140 may be coupled to 3D display 160 utilizing one or more data connections, for example, that may be wired or wireless data connections, for instance, such as a wired or wireless high definition multimedia interface (HDMI). Also, although content server 120 is shown as not directly connected to a 3D display, such as 3D display 160 in FIG. 1 for example, content server 120 may also be connected directly to an additional 3D display (not shown in FIG. 1) and be configured to provide 3D visual media to the additional 3D display.

Although only a single client is depicted in FIG. 1, it should be understood that content server 120 may be coupled to more than one client and be configured to provide 3D visual media to each coupled client substantially concurrently. For example, in one alternative embodiment, content server 120 may be coupled to three separate clients similar to client 140 over network 130, for example, and be configured to use tuner 110 to provide 3D visual media from one 3DTV channel to the first client and 3D visual media from a separate 3DTV channel to the second client, and to use storage media 112 to provide 3D visual media from storage media 112 to the third client, for example, for substantially simultaneous presentation by three different displays coupled to the three different clients.

To manage any of the above-described distributions of 3D visual media, content server 120 may be configured to determine a plurality of supported 3D modes of any coupled client, for example, in order to enable one of the plurality of supported 3D modes for that client and then provide 3D visual media to that client for presentation by a coupled display. For example, in one embodiment, content server 120 may be configured to send a command to client 140 over network 130, for example, requesting notification of all supported 3D modes of client 140. Client 140 may be configured to reply to such a request by sending data representing its plurality of supported 3D modes to content server 120, for example, where such data may comprise an array of bitmasks, for example, that may be configured to communicate at least one supported 3D mode for each video resolution supported by client 140, by a coupled display, such as 3D display 160, for example, or by a combination of client 140 and 3D display 160. In other embodiments, such reply data may comprise any data structure that may be configured to communicate at least one supported 3D mode for one or more video resolutions supported by displays generally, even if client 140 and/or 3D display 160, for example, do not support all the one or more video resolutions supported by displays generally.

A 3D mode of a client, such as client 140, for example, may be any configuration of client 140 corresponding to an arrangement of 3D visual media for presentation by a 3D display, such as 3D display 160, for example, at a particular resolution. For instance, a 3D mode may comprise a frame packing 3D mode corresponding to a frame packing 3D structure for 3D visual media, where client 140 is configured to expect 3D visual media comprising one or more data streams of alternating full frame/resolution images, such as a first frame comprising a left eye image and the next frame comprising a right eye image and so on, for example. In such a frame packing 3D structure, each frame may be coded in different data streams or layers in a time-synchronous manner or temporally multiplexed in a single data stream, and frames with the left eye image may reliably occur first in a pair, for example.

Another 3D mode may comprise a side-by-side 3D mode corresponding to a side-by-side 3D structure for 3D visual media, where client 140 is configured to expect 3D visual media comprising one or more data streams of successive frames of two half-resolution images, where every frame is comprised of a left eye image on the left half of the frame and a right eye image on the right half of the frame, for example. Such side-by-side, spatially multiplexed images within a frame may be time-synchronous and may be oriented without any inversion or mirroring.

Yet another 3D mode may comprise a top-and-bottom 3D mode corresponding to a top-and-bottom 3D structure for 3D visual media, where client 140 may be configured to expect 3D visual media comprising one or more data streams of successive frames of two half resolution images, where every frame comprises a left eye image on the top half of the frame and a right eye image on the bottom half of the frame. Such top-and-bottom spatially multiplexed images within a frame may be time-synchronous and may be oriented without any inversion or mirroring.

Client 140 may be configured to support any such 3D modes at any resolution supported by 3D display 160, for example, or, alternatively, may be configured to support such 3D modes at more or fewer resolutions supported by 3D display 160. For instance, in one embodiment, 3D display 160 may be able to support 3D visual media only in a top-and-bottom 3D structure at resolutions of 720p or less, but client 140 may be configured to support 3D visual media in all structures described above, for example, at resolutions up to 1080p. In such case, client 140 may be configured to reply to a command requesting notification of all supported 3D modes of client 140 by sending an array of bitmasks to content server 120, for example, communicating support for all 3D modes described above, for example, at resolutions up to 1080p, where client 140 may additionally be configured to conform 3D visual media provided by content server 120 to a top-and-bottom 3D structure at a resolution of 720p or less for presentation by 3D display 160, for example. As such, client 140 may be configured to offload general video scaling and positioning operations from content server 120, for example.

Alternatively, client 140 may be configured to reply to such a command by sending an array of bitmasks to content server 120, for example, communicating support for only a top-and-bottom 3D mode, as described above, for example, at resolutions 720p or less, thus communicating only the 3D modes corresponding to the 3D structures and resolutions supported by 3D display 160, for example. In such case, client 140 may additionally be configured to conform 3D visual media provided by content server 120 to a top-and-bottom 3D structure at a resolution of 720p or less for presentation by 3D display 160, for example. Thus, client 140 may communicate a limited number of supported 3D modes to content server 120, for example, but still be configured accept 3D visual media from content server 120 in 3D structures and resolutions other than those explicitly supported by, for example, coupled 3D display 160. Thus, even though client 140 may be configured to communicate a limited number of supported 3D modes to content server 120, for example, it may still be configured to offload general video scaling and positioning operations, for example, from content server 120.

In a separate embodiment, where client 140 may include limited capabilities, such as only support for 3D visual media having a top-and-bottom 3D structure at resolutions of 720p or less, for example, or limited video scaling and positioning capabilities, client 140 may be configured communicate such limitations to content server 120 utilizing one or more bitmasks, for example, transmitted to content server 140 in reply to commands requesting such capabilities of the client, in addition to replying to a command requesting notification of all supported 3D modes of client 140, as described above. In such case, client 140 may communicate an inability to accept 3D visual media other than that having a top-and-bottom 3D structure at resolutions of 720p or less, as well as communicating support only for top- and bottom 3D modes at resolutions of 720p or less, for example, corresponding to those 3D structures and resolutions supported by 3D display 160. Thus, where client 120 is unable to offload general video scaling and positioning operations, for example, from content server 120, content server 120 may additionally be configured to conform 3D visual media provided by tuner 110, for example, to a 3D mode supported by client 140.

For those resolutions where client 140 or 3D display 160 do not support any active 3D mode, such as the three 3D modes described above, for example, client 140 may communicate a bitmask corresponding to a null, "none," or "not supported" 3D mode for client 140 or 3D display 160 at that particular resolution. Typically, such null 3D mode is exclusive for a particular resolution, whereas any of the aforementioned active 3D modes are non-exclusive. Thus, where available 3D modes include only the 3D modes disclosed herein, namely an exclusive null 3D mode and three non-exclusive 3D modes, an array element of the array of bitmasks configured to communicate at least one supported 3D mode for each video resolution supported by client 140, by a coupled display, such as 3D display 160, for example, or by a combination of client 140 and 3D display 160, as described above, may comprise three bits.

Upon receiving such reply data from client 140, content server 140 may be configured to enable one of the plurality of supported 3D modes communicated by the reply data and then provide 3D visual media to client 140 over network 130, for example, for presentation by 3D display 160. For example, in one embodiment, content server 120 may be configured to send a command to client 140 over network 130, for example, enabling a highest resolution and highest quality 3D mode supported by client 140. Thus, as described in one of the embodiments above, content server 120 may enable a top-and-bottom 720p 3D mode for client 140 and provide 3D visual media in a frame packing 3D structure at 1080p to client 140, relying on client 140 to conform the provided 3D visual media to the enabled top-and-bottom 720p 3D mode. In other embodiments, where client 140 communicates a null 3D mode at a particular resolution, for example, or under other circumstances described below, content server 120 may additionally enable a flatten mode for client 140, relying on client 140 to conform provided 3D visual media to both the enabled 3D mode and the enabled flatten mode.

A flatten mode for a client, such as client 140, corresponds to a flatten structure for 3D visual media where only the left or right eye image is rendered on both the left and right eye images presented by 3D display 160, for example, which effectively removes any perception of depth produced by different left and right eye images. For instance, when providing 3D visual media to 3D display 160 using a top- and bottom 3D structure, client 140, when in a flatten mode, may conform the 3D visual media to the flatten mode by replacing the bottom half of each frame with a copy of the top half and then providing each conformed/flattened frame to 3D display 160, for example. When enabling a flatten mode of client 140, content server 120 may specify which image to replicate as well as whether to flatten, for example. Content server 140 may enable any such flatten mode by sending a corresponding command to client 140 over network 130, for example. By including a flatten mode, embodiments of the present inventive concepts may be configured to reduce or eliminate a potential for user discomfort when viewing mixed 2D and 3D content, for example, and may additionally provide a relatively inexpensive option to support non-3D displays. Examples of such correspondence described above between a content server and a client are provided below.

By providing such a robust and configurable system, embodiments of the present invention may automatically manage distribution of 3D visual media across a number of connected clients seamlessly according to the capabilities of each individually connected client and/or coupled display.

For example, in one embodiment, where client 140 is coupled to 3D display 160 over an HDMI, upon request by content server 120, client 140 may be configured to establish a plurality of supported 3D modes by querying an extended display identification data (EDID) of 3D display 160, for example, and then to send an HDMI vendor specific infoframe (VSI) to display 160 corresponding to a 3D mode enabled by content server 120.

In order to manage any of the above described distributions of 3D visual media according to the desires of a user, for example, content server 120 may additionally be configured to provide a remote user interface to client 140, for example, for presentation by 3D display 160, and receive remote user commands corresponding to options provided through the remote user interface, for example. As shown in FIG. 1, 3D media distribution 100 may include remote control 150. Remote control 150 may be any wired or wireless device configured to accept user input and provide it to client 140, for example, in response to options provided through a remote user interface, for example. Client 140 may in turn be configured to forward such user input to content server 140. However, while remote control 150 is shown in FIG. 1 as coupled to client 140, in alternative embodiments, remote control 150 may instead be coupled to content server 120, 3D display 160, or other clients or devices coupled to content server 120 over network 130, for example, where any device coupled to remote control 150 may be configured to accept user input from remote control 150 and provide it to any other device coupled to network 130. For instance, remote control 150 may be used to provide user input to client 140 in response to options for client 140, for example, provided through a local user interface built into client 140, in addition to providing user input to content server 120.

A remote user interface provided by content server 120 may comprise a bitmap of pixels or plurality of graphics commands, for example, configured to convey a visual plurality of options to a user using, for example, 3D display 160. For instance, a remote user interface may comprise a channel guide for accessing 3D visual media provided by tuner 110, for example, or a menu for accessing stored 3D visual media on storage media 112. In one embodiment, content server 120 may be configured to provide a remote user interface to client 140, for example, as a series of graphics frames comprising bitmaps of pixels generated by content server 120, similar to how content server 120 provides 3D visual media to client 140, as described above. Moreover, content server 120 may be configured to provide such a remote user interface to client 140 using a variety of methods, for example, to reduce utilization of network 130 or to enable various levels of 3D imagery, depending on the desired experience of a content provider, for example, or a manufacturer of content server 120, or even a user of 3D media distribution system 100.

Figure 2:
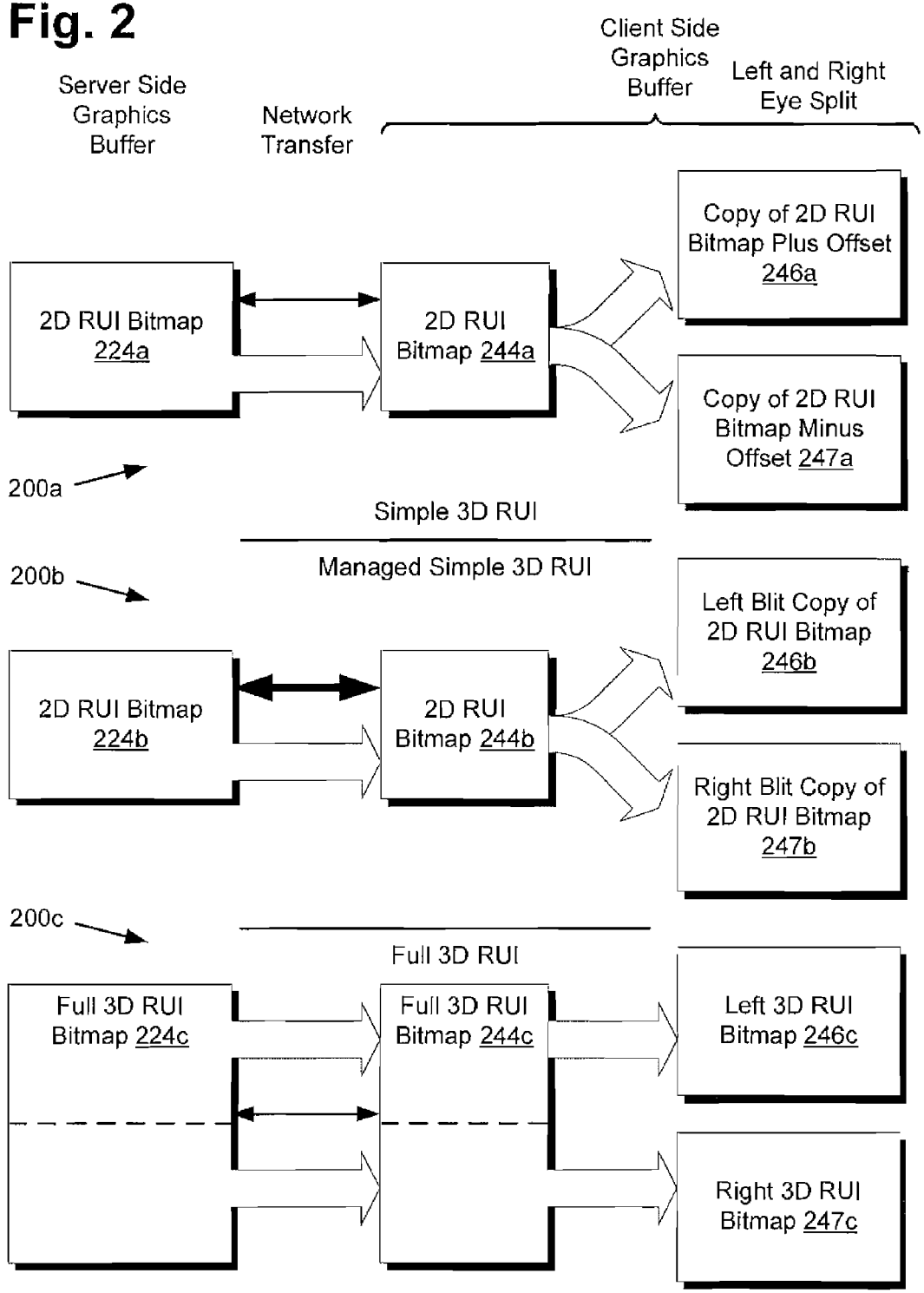
FIG. 2 presents a series of diagrams of systems and methods for managing distribution of 3D media, according to one embodiment of the present invention.

FIG. 2 shows three methods for a content server to provide a remote user interface (RUI) to a client over a network. In FIG. 2, large uni-directional arrows signify transmission of pixel graphics data, and smaller bi-directional arrows signify transmission of control commands and responses. To better describe each method shown in FIG. 2, 3D media distribution system 100 in FIG. 1 is used as a contextual embodiment, where content server 120 has enabled a frame packing 3D mode of client 140, for example, and a single, frame packed graphics frame of a remote user interface is to be provided to 3D display 160. However, it should be understood that these methods or similar methods may be used when a client is in any enabled 3D mode, such as the side-by-side 3D mode or the top-and-bottom 3D mode, as described above, or when providing any multiple of graphics frames to a client.

Simple 3D RUI method 200a comprises content server 120 having 2D RUI bitmap 224a in server memory 124, for example, such as a server side graphics buffer, and being configured to send bitmap 224a as a frame of graphics data over network 130 to client 140, for example, and to place it in client memory 144 as 2D RUI bitmap 244a, for example, for eventual presentation by 3D display 160. In addition, content server 120 may be configured to send a z-axis offset to client 140, for example, in the form of a control command, in order to provide a simple, global 3D effect to 2D RUI bitmap 224a.

2D RUI bitmap 224a may comprise a single conventional 2D graphics image, for example, that may be a portion of a conventional RUI for managed distribution of 2D visual data, for example, which is reused to save the cost and time of developing a new remote user interface specifically for managed distribution of 3D visual data. Alternatively, 2D RUI bitmap 224a may be a single 2D graphics image developed without the cost and time required to develop a 3D RUI. In one embodiment, 2D RUI bitmap 224a may comprise full resolution 2D graphics images, according to the enabled 3D mode, in order to maintain a high quality RUI image.

Once 2D RUI bitmap 244a is in client memory 144, such as a client side graphics buffer, for example, client 140 may be configured to conform 2D RUI bitmap 244a to the z-axis offset and the enabled 3D mode of client 140, or a frame packing 3D mode, for example. Such conforming may comprise, for example, copying 2D RUI bitmap 244a plus the z-axis offset to left eye frame 246a, for example, and copying 2D RUI bitmap 244a minus the z-axis offset to the right eye frame 247a, where a larger offset decreases a perceived depth of the RUI by moving left eye frame 246a right and right eye frame 246b left, relative to 2D RUI bitmap 244a. Such conforming step may also include scaling to a different resolution, for example, corresponding to an enabled 3D mode of client 140, for example. Once left eye frame 246a and right eye frame 247a are formed within client memory 144, each frame may be composited with a corresponding frame of 3D visual media, as described more fully below.

By utilizing such a method, embodiments of the present inventive concepts may provide a 3D RUI with only minimal changes to a content server and associated RUI used to manage distribution of 2D visual media, all without increasing the amount of graphics data sent over network 130, for example, to client 140. Thus, embodiments of the present invention may provide significant cost savings when converting a 2D media distribution system into a 3D media distribution system.

Depending on the graphics capabilities of a client, such as client 140, a conforming step may also include graphics operations designed to correct for image errors associated with conforming an RUI with a z-axis offset, for example, such as automatically creating a thicker border on an edge of a left or right eye frame to compensate for moving either frame left or right. Such image error correction may be automatically controlled by client 140, for example, which may minimize network congestion while allowing client manufacturers to provide value-added features, or may be controlled by content server 120 through control commands sent over network 130, for example.

For instance, moving to managed simple 3D RUI method 200b, method 200b comprises much the same steps as simple 3D RUI method 200a, except that content server is additionally configured to first determine a plurality of supported graphics buffer operations of the client in order to provide additional 3D effects to, for example, 2D RUI bitmap 244b. For example, in one embodiment, client 140 may be configured to support a variety of blit operations on its graphics buffer; e.g., a portion of client memory 144. Content server 120 may be configured to send a command to client 140 requesting all such supported graphics buffer operations and then provide 2D RUI bitmap 224b and at least one of the supported graphics buffer operations to client 140. Utilizing graphics buffer operations, such as blit operations, for example, client 140 may be configured to apply a z-axis offset, for example, to individual areas of 2D RUI bitmap 244b, for example, rather than just the entire RUI bitmap, thereby providing additional 3D effects to, for example, 2D RUI bitmap 244b. Once such left blit copy or left eye frame 246b and right blit copy or right eye frame 247b are created, each frame may be composited with a corresponding frame of 3D visual media, as noted above. Left eye frame 246b and right eye frame 247b may be conformed to an enabled 3D mode of client 140 substantially simultaneously with client 140 applying the graphics operations provided by content server 120.

By utilizing such a method, embodiments of the present inventive concepts may provide an enhanced 3D RUI, relative to the simple 3D RUI method described above, with only minimal changes to a content server and associated RUI used to manage distribution of 2D visual media. Moreover, these embodiments may do so by only minimally increasing the amount of control data sent over network 130 to client 130 (e.g., shown as a thicker bi-directional arrow in FIG. 2), for example, relative to simple 3D RUI method 200a, though almost any amount of additional desired 3D complexity may be added with additional control data, depending on the graphics buffer commands supported by, for example, client 140. Thus, embodiments of the present invention may provide significant cost savings when converting a 2D media distribution system into a 3D media distribution system, but provide an enhanced 3D RUT experience relative to a simple, globally applied z-axis offset.

In contrast to either of the previous methods, full 3D RUI method 200c provides the most control over the 3D RUI, but at the expense of network traffic and content server load. As shown in FIG. 2, full 3D RUI method 200c comprises content server having full 3D RUI bitmap 224c in server memory 124, for example, and being configured to send bitmap 224c as a frame packed frame of graphics data over network 130 to client 140, for example, and to place it in client memory 144 as full 3D RUI bitmap 244c. Although full 3D RUI bitmaps are shown in FIG. 2 as single large bitmaps at double the enabled 3D mode resolution, it should be understood that each eye frame may alternatively be sent over network 130, for example, as separate left and right eye data streams, for example, as explained above. Once full 3D RUI bitmap 244c is in client memory 144, client 140 may be configured to temporally separate bitmap 244c into left and right eye frames 246c and 247c, if needed, and each frame may be composited with a corresponding frame of 3D visual media, as noted above.

By utilizing such a method, embodiments of the present inventive concepts may provide a fully 3D RUI transparently with respect to a client, meaning that a client need no special graphics operations or even a z-axis offset capability in order to enable the present method. Moreover, a content server capable of providing such a full 3D RUI may apply sophisticated algorithms to compute, for example, optimal angles and positions of stereo graphics, in order to provide a 3D RUI with more 3D features and 3D detail than can be provided with either of the two previous methods. Thus, embodiments of the present invention may provide a full 3D RUI without requiring special graphics features of a client.

It should be noted that where a content provider or a manufacturer of a content server does not wish to provide a 3D RUI experience, or where a user wishes to disable a 3D RUI experience, content server 120 may be configured to enable a flatten mode of client 140, for example, provide a 2D RUI, such as 2D RUI bitmap 224a in FIG. 2, for example, where client 140 may be configured to conform provided 3D visual media to the flatten mode and composite the 2D RUI and the conformed 3D visual media, as is explained more fully below. In addition, where a content provider, manufacturer of content server 120, or a user wishes to disable 3D video while viewing a 3D RUI composited with visual media, content server 120 may be configured to enable a flatten mode of client 140, for example, where client 140 may be alternatively configured to conform provided 3D visual media to the flatten mode and composite a 3D RUI, such as one provided through any of the methods described above, and the conformed 3D visual media.

Figure 3:
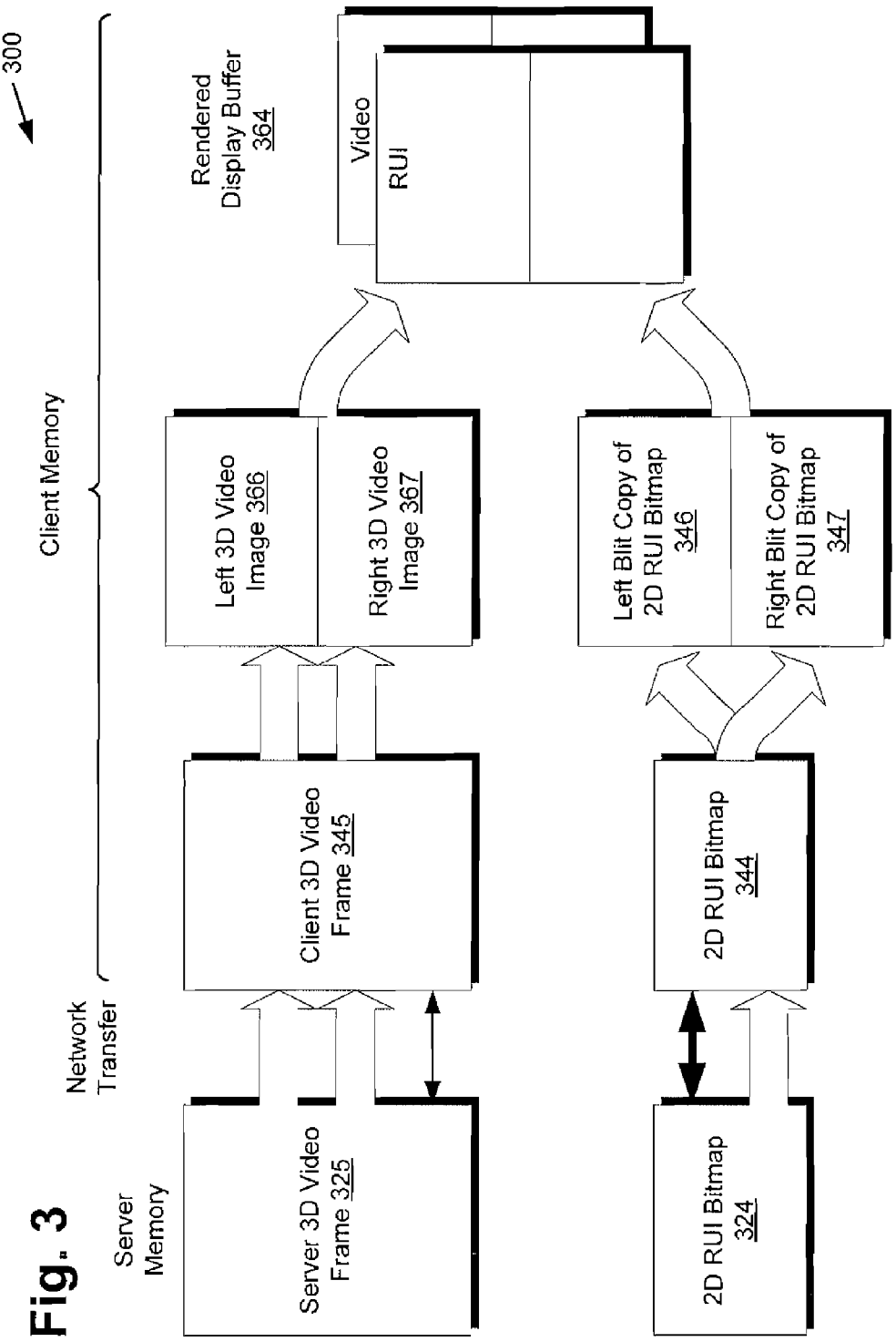
FIG. 3 presents a diagram of a system and method for managing distribution of 3D media, according to one embodiment of the present invention.

Moving on to the embodiment depicted by FIG. 3, FIG. 3 shows how a client may be configured to composite an RUI and 3D visual media. To better describe the method shown in FIG. 3, 3D media distribution system 100 in FIG. 1 is used as a contextual embodiment, where content server 120 has enabled a top-and-bottom 3D mode of client 140, for example, content server 120 is using a managed 3D simple RUI method to create a 3D RUI, a single graphics frame of a remote user interface is composited with a single frame of 3D visual media, and the resulting composition provided to 3D display 160. As with the methods shown in FIG. 2, it should be understood that this method or similar methods may be used when a client is in any enabled 3D mode, such as the side-by-side 3D mode or the frame packing 3D mode, as described above, or when providing any multiple of composited frames to a display.

As described above with respect to method 200b of FIG. 2, content server 120 may be configured to send a full resolution 2D RUI bitmap 324 and one or more graphics operations to client 140 over network 130 and place it in client memory 144 as 2D RUI bitmap 344. Client 120 may be configured to then apply the provided one or more graphics operations to 2D RUI bitmap 344 while coping it to left blit copy 346 and right blit copy 347, corresponding to a left eye frame and a right eye frame, resulting in a frame of 3D RUI data having a top-and-bottom 3D structure, as described above, thereby conforming the RUI to the enabled top-and-bottom 3D mode of client 140. As noted previously, during such conforming step, full resolution 2D RUI bitmap 344 may be substantially simultaneously scaled while being copied to left blit copy 346 and right blit copy 347, thus conforming the RUI to the resolution of the enabled 3D mode.

With respect to the 3D visual media, as shown in FIG. 3, server 3D video frame 325, which may be provided by tuner 110, for example, and which may reside in content server memory 144, may be provided to client 140 over network 130 and placed in client memory 144 as client 3D video frame 345, substantially unchanged from the form provided by content server 120, for example. Then, client 140 may be configured to prepare 3D video frame 345 to be composited with the RUI frame. For example, in an embodiment where the RUI comprises a channel guide and content server 120 designates that video displayed while the RUI is being displayed must be relegated to a relatively small corner of the display screen, client 140 may be configured to scale left and right portions of client 3D video frame 345 small enough to fit in the small corner and, for example, position each respective scaled portion in a top right corner of left 3D video image 366 and right 3D video image 367. In other embodiments, client 140 may be configured to reduce an overall saturation of the 3D video frame, for example, to accentuate the RUI. In still other embodiments, client 140 may be configured to leave client 3D video frame 345 untouched and simply designate left and right 3D video images 366 and 367, thus minimizing memory utilization of client 140, for example.

Once left and right 3D video images 366 and 367 and left and right blit copies 346 and 347 are present in client memory 144, for example, client 140 may be configured to composite the respective images and form rendered display buffer 364, which is provided directly to 3D display 160 for presentation to a user, for example. Thus, where client 140 is configured to conform an RUI and provided 3D visual media to an enabled 3D mode, client 140 may do so and composite the conformed RUI and the conformed 3D visual media, even where the enabled 3D mode is a null 3D mode or content server 120 has enabled a flatten mode of client 140, for example. Furthermore, even where client 140 is provided a full 3D RUI, client 140 may be configured to composite the 3D RUI and conformed 3D visual media. Typically, each 3D RUI frame overlays a 3D video frame, as shown in FIG. 3. However, it should be noted that when compositing the 3D RUI and video frames, as shown in FIG. 3, client 140 may be configured to apply a transparency metric, or alpha channel, to the 3D RUI frame or portions of the 3D RUI frame in order to allow overlay of the 3D RUI frame without completely obscuring the 3D video frame, for example. Additionally, other video images having other transparency metrics may be composited with the RUI and the video substantially concurrently, such as closed captioning images, or a default background image, for example.

Thus, embodiments of the present invention may provide a 3D RUI for interaction with a user, utilizing remote control 150, for example, substantially concurrently while presenting 3D visual media. Moreover, the robust configurability provided by embodiments of the present inventive concepts reduces overall cost of implementation, both to content providers and user/customers, particularly when a 2D media distribution system is already in place.

It should be noted that although compositing of an RUI and 3D visual media may be performed in a display buffer of client 140, for example, situated in client memory 144, in other embodiments, where 3D display 160 is integrated with client 140, for example, compositing may be performed in a display buffer situated in 3D display memory 164.

Figure 4:
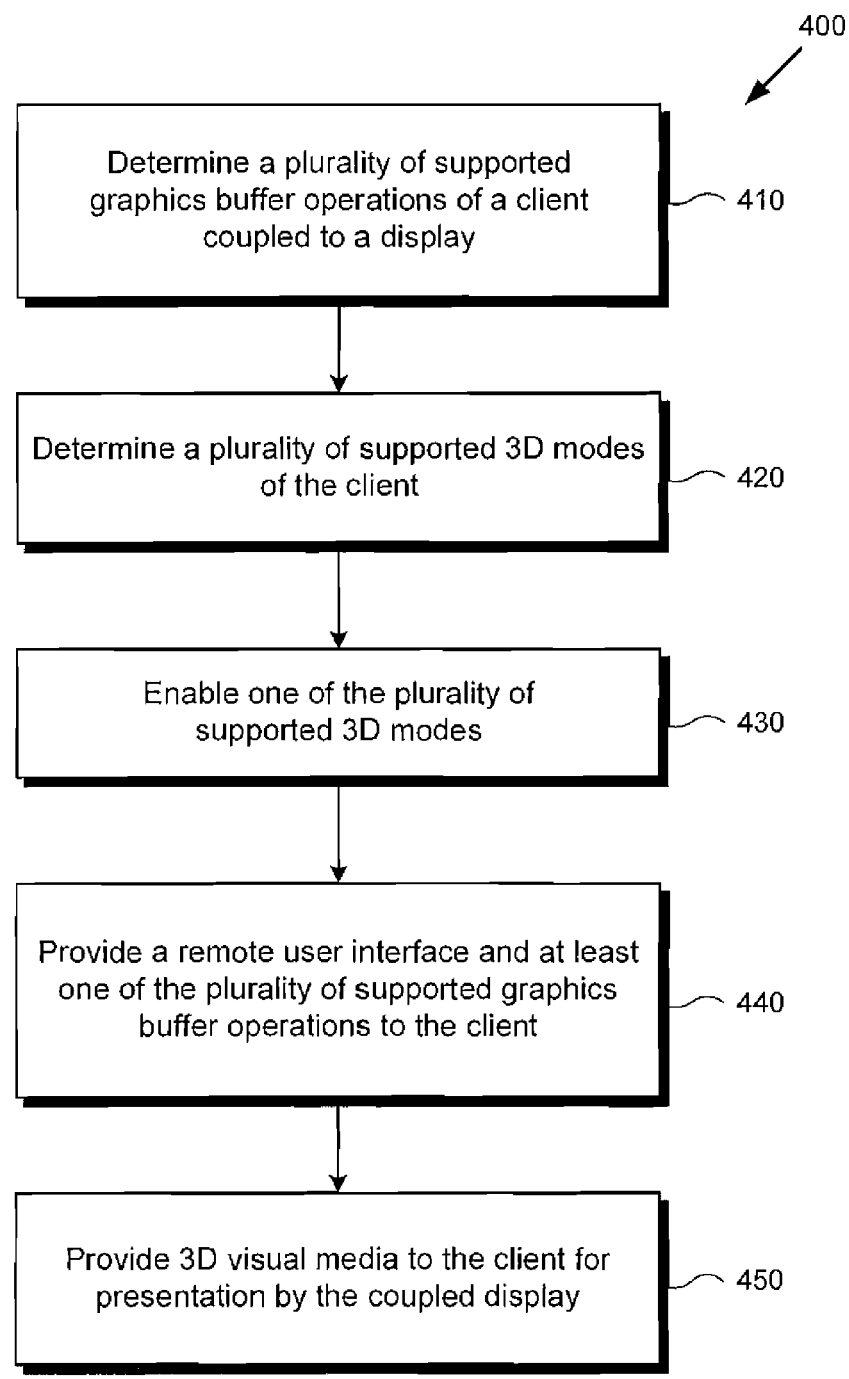
FIG. 4 presents flowchart of a method for managing distribution of 3D media, according to one embodiment of the present invention.

FIG. 4 shows a flow chart illustrating a method for a content server, such as content server 120 of FIG. 1 for example, to manage distribution of 3D visual media to a plurality of displays, according to an embodiment of the present invention. Certain details and features have been left out of flowchart 400 that are apparent to a person of ordinary skill in the art. For example, a step may consist of one or more substeps or may involve specialized equipment, as known in the art. Steps 410 through 450 indicated in flowchart 400 are sufficient to describe one embodiment of the present invention; however, other embodiments of the invention may make use of steps different from those shown in flowchart 400.

Referring now to step 410 of the method embodied in FIG. 4, step 410 of flowchart 400 comprises content server 120 determining a plurality of supported graphics buffer operations of client 140 coupled to 3D display 160. As explained previously, content server 120 may be configured to send a command to client 140 over network 130, for example, requesting all supported graphics buffer operations, and client 140 may be configured to reply by sending reply data configured to communicate all supported graphics buffer operations, thus allowing content server 120 to reliably determine all supported graphics buffer operations of client 140, for example. Additionally, this step may include requesting and receiving reply data configured to communicate limited capabilities of client 140 separate from supported 3D modes of client 140, as described above.

Continuing with step 420 in FIG. 4, step 420 comprises content server 120 determining a plurality of supported 3D modes of client 140. As described above, content server 120 may be configured to send a command to client 140 over network 130, for example, requesting all supported 3D modes of client 140, and client 140 may be configured to reply by sending reply data configured to communicate all supported 3D modes for each resolution supported by 3D display 160, for example, or all supported 3D modes for each resolution supported by client 140, or for all resolutions supported by display devices generally. In one embodiment, such reply data may comprise an array of bitmasks, for example. Thus, content server 120 may reliably determine all supported 3D modes of client 140, for example.

Moving now to step 430 in FIG. 4, step 430 comprises content server 120 enabling one of the 3D modes supported by client 140. As explained above, content server 120 may be configured to send a command to client 140 over network 130, for example, enabling a specific 3D mode of client 140, for example. This step may include enabling a flatten mode of client 140, which may be applied only to provided 3D visual media when content server 120 additionally provides an RUI to client 140, or may be applied to provided 3D visual media and to a provided RUI, for example.

Continuing with step 440 in FIG. 4, step 440 comprises content server 120 providing an RUI and at least one of the plurality of supported graphics buffer operations to client 140. As noted above, content server 120 may be configured to provide a 2D RUI and one or more graphics buffer operations to client 140 over network 130, for example, in order for client 140 to provide an enhanced 3D RUI to a user without requiring transfer of a full 3D graphics frame over network 130 and potentially causing congestion over network 130, for example.

Step 450 in FIG. 4 comprises content server 120 providing 3D visual media to the client for presentation by 3D display 160. As described previously, content server may be configured to provide 3D visual media to client 120 in a 3D structure and/or resolution different from that corresponding to an enabled 3D mode of client 140, where content server 120 relies on client 140 to conform the provided 3D visual media to the enabled mode, thereby reducing a computational load on content server 140, for example. However, in other embodiments, where client 140 has limited capabilities and has communicated them to content sever 120, as explained above, content server 120 may be configured to provide conformed 3D visual media in a 3D structure and resolution corresponding to an enabled 3D mode of client 140, for example. Subsequently, client 140 may be configured to composite any combination of a conformed or un-conformed RUI and conformed or un-conformed 3D visual media and render such composite to a display buffer for presentation by, for example, 3D display 160.

As noted above, by providing such a robust and configurable system, embodiments of the present invention may automatically manage distribution of 3D visual media to many different connected clients seamlessly according to the capabilities of each individually connected client and/or coupled display. Moreover, by providing a cost effective means for providing a remote user interface in conjunction with 3D visual media, with a clear upgrade path for both clients and content servers, embodiments of the present invention advantageously lower entry costs for content providers, manufacturers, and users into 3D visual media systems.

The following are a non-exclusive list of example commands enabling aspects of the managed distribution of 3D content, as described above, portrayed as additions to the open RVU protocol:

TABLE 1

GetGraphicsCaps response attributes

| Attribute | Description | Type |
|---|---|---|
| Supported3DTVStructures[5] | An array of bitmasks of the following flags representing which 3DTV structures are supported for each display format. | hex |

TABLE 1-continued

GetGraphicsCaps response attributes

| Attribute | Description | Type |
|---|---|---|
| | supported3DTVStructures[0] lists the 3DTV structures supported for 480i. | |
| | supported3DTVStructures[1] lists the 3DTV structures supported for 480p. | |
| | supported3DTVStructures[2] lists the 3DTV structures supported for 720p. | |
| | supported3DTVStructures[3] lists the 3DTV structures supported for 1080i. | |
| | supported3DTVStructures[4] lists the 3DTV structures supported for 1080p: | |
| | Values for each array element: | |
| | 0x00: None (3DTV not supported for this format) | |
| | 0x01: Frame Packing (Full resolution for each eye/view) | |
| | 0x02: Side-by-Side (Half resolution for each eye/view) | |
| | 0x04: Top-and-Bottom (Half resolution for each eye/view) | |

TABLE 2

ReconfigureDisplayBuffer3DTV command attributes

| Attribute | Description | Type |
|---|---|---|
| commandToken | A unique ID representing this command. | uint |
| 3DTVStructure | The 3DTV structure. 0x00: Frame Packing (Full resolution for each eye/view) 0x01: Side-by-Side (Half resolution for each eye/view) 0x02: Top-and-Bottom (Half resolution for each eye/view) | hex |
| Width | The width of the left and right buffer regions with respect to the output. | uint |
| Height | The height of the left and right buffer regions with respect to the output. | uint |
| Xres | The full horizontal resolution of the graphics buffer that includes both the left and right eye/view regions. | uint |
| Yres | The full vertical resolution of the graphics buffer that includes both the left and right eye/view regions. | uint |
| pixelFormat | The pixel format, one of CLUT-8 or ARGB-32 | string |
| LeftX | Optional The X position of the left eye region with respect to the buffer. If not provided by the RVU server, the RVU client shall use a value of 0. | uint |
| LeftY | Optional The Y position of the left eye region with respect to the buffer. If not provided by the RVU server, the RVU client shall use a value of 0. | uint |
| RightX | Optional The X position of the right eye region with respect to the buffer. If not provided by the RVU server, the RVU client shall use a value of xRes/2. | uint |
| RightY | Optional The Y position of the right eye region with respect to the buffer. If not provided by the RVU server, the RVU client shall use a value of 0. | uint |
| leftRightWidth | Optional The width of the left eye and right eye regions with respect to the buffer. If not provided by the RVU server, the RVU client shall use a value of xRes/2. | uint |
| leftRightHeight | Optional The height of the left eye and right eye regions with respect to the buffer. If not provided by the RVU server, the RVU client shall use a value of yRes. | uint |
| X | Optional The horizontal (x) position for the buffer (output coordinate). If not provided by the RVU server, the RVU client shall use a value of 0. | uint |
| Y | Optional The vertical (y) position for the buffer (output coordinate). If not provided by the RVU server, the RVU client shall use a value of 0. | uint |

TABLE 3

Set3DTVFlattenStructure command attributes

| Attribute | Description | Type |
|---|---|---|
| commandToken | A unique ID representing this command. | uint |
| flattenStructure | Specify whether 3DTV video shall be flattened or preserved:<br>0: Do not flatten.<br>1: Replicate left or top on both left/top and right/bottom output.<br>2: Replicate right or bottom on both left/top and right/bottom output. | uint |

TABLE 0

SetGraphicsZOffset command attributes

| Attribute | Description | Type |
|---|---|---|
| commandToken | A unique ID representing this command. | uint |
| Offset | Specifies a positive or negative horizontal offset in pixels, creating depth along the z-axis for all RUI graphics. | Int |

The following provides an example of how ReconfigureDisplayBuffer3DTV might be used. The initial conditions for this example are:

The RVU Client reported its output canvas resolution using an OutputSettingsChanged event. The xRes was reported as 1920. The yRes was reported as 1080.

The RVU Server uses 720×480 graphics buffers. When switching to a side-by-side stereoscopic 3D structure, the RVU Client graphics buffer will be set to 1440×480 to provide space for the left eye region and right eye region.

The desired 3DTV structure is obtained by the following attribute values sent in the ReconfigureDisplayBuffer3DTV command:

| | |
|---|---|
| 3DTVStructure | 0x01 (Side-by-Side) |
| width = 1920 | Output canvas width |
| height = 1080 | Output canvas height |
| xRes = 1440 | Full width of the display buffer needed to hold the left and right eye regions. |
| yRes = 480 | Full height of the display buffer needed to hold the left and right eye regions. |
| pixelFormat = ARGB | |
| leftX = 0 | (default) |
| leftY = 0 | (default) |
| rightX = 720 | |
| rightY = 0 | (default) |
| leftRightWidth = 720 | |
| leftRightHeight = 480 | |
| x = 0 | (default) |
| y = 0 | (default) |

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A content server for managing distribution of three dimensional (3D) visual media to a client over a network, the client having a display, the content server comprising:
   a server processor configured to:
      receive, over the network, an indication of a plurality of supported 3D modes of the client;
      transmit a command to the client over the network, the command comprising a first field to indicate a width of at least one of a right eye region or a left eye region of a display buffer of the client, a second field to indicate a height of at least one of the right eye region or the left eye region of the display buffer, and a third field to indicate one of the plurality of supported 3D modes; and
      provide the 3D visual media to the client over the network for presentation on the display of the client based at least on the display buffer indicated by the command.

2. The content server of claim 1, wherein the plurality of supported 3D modes comprises at least one 3D mode of the plurality of supported 3D modes for each video resolution supported by the coupled display.

3. The content server of claim 1, wherein the client is configured to conform the 3D visual media to the enabled 3D mode by modifying at least one frame of the 3D visual media.

4. The content server of claim 1, wherein the server processor is further configured to provide a remote user interface to the client and receive a remote user command, and wherein the client is configured to conform the remote user interface and the 3D visual media to the enabled 3D mode and to composite the conformed remote user interface and the conformed 3D visual media, the client being distinct from the server processor.

5. The content server of claim 1, wherein the server processor is further configured to provide a remote user interface and a z-axis offset to the client, and wherein the client is configured to conform the remote user interface to the z-axis offset and the enabled 3D mode.

6. The content server of claim 1, wherein the server processor is further configured to:
   determine a plurality of supported graphics buffer operations of the client;
   provide a remote user interface and at least one of the plurality of supported graphics buffer operations to the client;
   the client being configured to apply the provided graphics buffer operations to the remote user interface and to conform the remote user interface to the enabled 3D mode.

7. The content server of claim 1, wherein the server processor is further configured to provide a 3D remote user interface to the client.

8. The content server of claim 1, wherein the server processor is further configured to provide a 3D remote user interface to the client, and wherein the client is configured to conform the 3D visual media to the enabled 3D mode and to composite the 3D remote user interface and the conformed 3D visual media.

9. The content server of claim 1, wherein the client is coupled to the display over a high definition multimedia interface (HDMI), and wherein the client is configured to establish the plurality of supported 3D modes by querying an extended display identification data (EDID) of the coupled display and to send an HDMI vendor specific infoframe (VSI) corresponding to the enabled 3D mode to the coupled display.

10. The content server of claim 1, wherein the server processor is further configured to:
enable a flatten mode of the client;
provide a remote user interface to the client;
the client being configured to conform the 3D visual media to the flatten mode and to composite the remote user interface and the conformed 3D visual media.

11. A method for use by a content server having a server processor to manage distribution of three dimensional (3D) visual media to a client over a network, the client having a display, the method comprising:
determining a plurality of supported 3D modes of the client;
transmitting a command to the client over the network to configure a display buffer of the client for the 3D visual media, the command comprising a first field to indicate a width of at least one of a right eye region or a left eye region of the display buffer, a second field to indicate a height of at least one of the right eye region or the left eye region of the display buffer, and a third field to indicate one of the plurality of supported 3D modes; and
providing the 3D visual media to the client over the network for presentation on the display of the client based at least in part on the display buffer.

12. The method of claim 11, wherein the plurality of supported 3D modes comprises at least one 3D mode for each video resolution supported by the coupled display.

13. The method of claim 11, wherein the client is configured to conform the 3D visual media to the enabled 3D mode.

14. The method of claim 11, further comprising:
providing a remote user interface to the client;
receiving a remote user command;
the client being configured to conform the remote user interface and the 3D visual media to the enabled 3D mode and to composite the conformed remote user interface and the conformed 3D visual media.

15. The method of claim 11, further comprising:
providing a remote user interface and a z-axis offset to the client;
the client being configured to conform the remote user interface to the z-axis offset and the enabled 3D mode.

16. The method of claim 11, further comprising:
determining a plurality of supported graphics buffer operations of the client;
providing a remote user interface and at least one of the plurality of supported graphics buffer operations to the client;
the client being configured to apply the provided graphics buffer operations to the remote user interface and to conform the remote user interface to the enabled 3D mode.

17. The method of claim 11, further comprising:
providing a 3D remote user interface to the client;
the client being configured to conform the 3D visual media to the enabled 3D mode and to composite the 3D remote user interface and the conformed 3D visual media.

18. The method of claim 11, wherein the client is coupled to the display over one or more data connections;
the client being configured to establish the plurality of supported 3D modes by querying the coupled display using at least one of the one or more data connections.

19. The method of claim 11, further comprising:
enabling a flatten mode of the client;
providing a remote user interface to the client;
the client being configured to conform the 3D visual media to the flatten mode and to composite the conformed remote user interface and the conformed 3D visual media.

20. A computer program product comprising instructions stored in at least one tangible non-transitory computer-readable storage medium, the instructions comprising:
instructions for configuring, over a network, a display buffer of a client device by at least transmitting a command to the client device, the command comprising a first field to indicate a width of at least one of a right eye region or a left eye region of the display buffer, a second field to indicate a height of at least one of the right eye region or the left eye region of the display buffer, and a third field to indicate one of a plurality of supported three-dimensional modes associated with the client device; and
instructions for providing three-dimensional visual media over the network for presentation on a display associated with the client device based at least on the configured display buffer of the client device.

* * * * *